(12) United States Patent
Yao et al.

(10) Patent No.: US 11,196,937 B2
(45) Date of Patent: Dec. 7, 2021

(54) HIGH FRAME RATE IN HIGH DYNAMIC RANGE PROCESSING

(71) Applicant: QUALCOMM Incorporated, San Diego, CA (US)

(72) Inventors: Yihe Yao, San Diego, CA (US); Lei Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/694,764

(22) Filed: Nov. 25, 2019

(65) Prior Publication Data

US 2021/0160419 A1 May 27, 2021

(51) Int. Cl.
| | |
|---|---|
| *H04N 5/235* | (2006.01) |
| *G06T 7/20* | (2017.01) |
| *H04N 5/225* | (2006.01) |
| *H04N 19/43* | (2014.01) |

(52) U.S. Cl.
CPC ............ *H04N 5/2355* (2013.01); *G06T 7/20* (2013.01); *H04N 5/2253* (2013.01); *H04N 19/43* (2014.11); *G06T 2207/20208* (2013.01)

(58) Field of Classification Search
None
See application file for complete search history.

(56) References Cited

U.S. PATENT DOCUMENTS

| | | | | |
|---|---|---|---|---|
| 8,699,827 | B2 * | 4/2014 | Sato | G06T 1/20 |
| | | | | 382/305 |
| 8,803,990 | B2 * | 8/2014 | Smith | H04N 5/3532 |
| | | | | 348/218.1 |
| 9,344,647 | B2 * | 5/2016 | Agranov | H04N 5/35536 |
| 9,774,789 | B2 * | 9/2017 | Ciurea | H04N 5/369 |
| 9,894,304 | B1 * | 2/2018 | Smith | H04N 9/04515 |
| 2012/0249728 | A1 * | 10/2012 | Kato | H04N 1/3871 |
| | | | | 348/36 |
| 2013/0070121 | A1 * | 3/2013 | Gu | H04N 5/2329 |
| | | | | 348/239 |
| 2013/0083226 | A1 * | 4/2013 | Kwan | H04N 9/0451 |
| | | | | 348/302 |
| 2013/0135486 | A1 * | 5/2013 | Wan | H04N 5/335 |
| | | | | 348/207.99 |
| 2015/0002689 | A1 * | 1/2015 | Weissman | H04N 5/2355 |
| | | | | 348/222.1 |
| 2015/0097978 | A1 * | 4/2015 | Lee | H04N 5/23277 |
| | | | | 348/208.6 |

(Continued)

OTHER PUBLICATIONS

Huang Z., et al., "A 2D-3D Hybrid Approach to Video Stabilization", IEEE, 2011, pp. 146-150, 2011.

*Primary Examiner* — Tyler W. Sullivan
(74) *Attorney, Agent, or Firm* — Qualcomm Incorporated

(57) ABSTRACT

This disclosure provides systems, methods, and apparatuses for high dynamic range (HDR) processing. In one aspect, an example HDR processing device may process a first exposure frame and a second exposure frame during a first capture sequence. The device may also generate a first HDR image from the first exposure frame and the second exposure frame at an end of the first capture sequence. The device may also process a third exposure frame during a second capture sequence that at least partially overlaps in time with the first capture sequence. The device may also generate a second HDR image from the second exposure frame and the third exposure frame.

28 Claims, 8 Drawing Sheets

(56) References Cited

U.S. PATENT DOCUMENTS

| | | | |
|---|---|---|---|
| 2015/0201118 A1* | 7/2015 | Lee | H04N 5/374 |
| | | | 348/222.1 |
| 2016/0093029 A1 | 3/2016 | Micovic et al. | |
| 2017/0041562 A1* | 2/2017 | Solhusvik | H04N 5/37457 |
| 2017/0142312 A1* | 5/2017 | Dal Mutto | H04N 13/239 |
| 2017/0229327 A1* | 8/2017 | Singh | H01J 37/32449 |
| 2018/0288311 A1 | 10/2018 | Baghert et al. | |
| 2018/0302548 A1 | 10/2018 | Bao et al. | |
| 2018/0343375 A1* | 11/2018 | Duran | H04N 5/2352 |
| 2019/0191068 A1* | 6/2019 | Novikov | H04N 5/2356 |
| 2019/0268072 A1* | 8/2019 | Aoyama | H04B 10/1141 |
| 2019/0288020 A1* | 9/2019 | Ikuma | H04N 5/353 |
| 2020/0211166 A1* | 7/2020 | Yao | H04N 5/23277 |
| 2020/0267339 A1* | 8/2020 | Douady-Pleven | H04N 19/597 |
| 2020/0280659 A1* | 9/2020 | Galor Gluskin | H04N 5/3535 |
| 2020/0344398 A1* | 10/2020 | Fruchtman | H04N 5/23229 |

* cited by examiner

HIGH FRAME RATE IN HIGH DYNAMIC RANGE PROCESSING

CROSS-REFERENCE TO RELATED APPLICATIONS

This patent application is related to U.S. patent application Ser. No. 16/236,147, entitled "METHODS AND APPARATUS FOR MOTION COMPENSATION IN HIGH DYNAMIC RANGE PROCESSING" and filed on Dec. 28, 2018, which is assigned to the assignee hereof. The disclosures of all prior applications are considered part of and are incorporated by reference in this patent application.

TECHNICAL FIELD

This disclosure relates generally to high dynamic range (HDR) processing, and relates specifically to improving frame rates when generating staggered HDR images.

DESCRIPTION OF THE RELATED TECHNOLOGY

A device, such as a camera, may capture and process exposure frames of a scene. Some devices may use one or more high dynamic range (HDR) processing techniques to process the exposure frames and generate one or more HDR images from the processed exposure frames. One example HDR processing technique is temporal HDR, which uses different exposure durations to capture exposure frames of varying length. Some devices may use staggered HDR processing techniques to capture multiple exposure frames within less than a frame time (or "capture sequence"), and then fuse together the multiple exposure frames to generate an HDR image.

The time and computational resources associated with processing exposure frames and generating HDR images in a device using conventional HDR processing techniques may limit the frame rate to an extent that precludes deployment of the device in various applications or environments. For example, the frame rate of cameras used by an autonomous vehicle for object detection may affect the collision avoidance capabilities of the autonomous vehicle, and therefore cameras having a relatively low frame rate are less desirable for the autonomous vehicle market than cameras having a relatively high frame rate.

SUMMARY

The systems, methods, and devices of this disclosure each have several innovative aspects, no single one of which is solely responsible for the desirable attributes disclosed herein.

One innovative aspect of the subject matter described in this disclosure can be used as a method of high dynamic range (HDR) processing. In some implementations, the method can include processing a first exposure frame and a second exposure frame during a first capture sequence, generating a first HDR image from the first exposure frame and the second exposure frame at an end of the first capture sequence, processing a third exposure frame during a second capture sequence that at least partially overlaps in time with the first capture sequence, and generating a second HDR image from the second exposure frame and the third exposure frame. In some aspects, each of the first exposure frame, the second exposure frame, and the third exposure frame is a line-based sensor exposure. In addition, or in the alternative, each of the first exposure frame, the second exposure frame, and the third exposure frame can be captured by a camera operationally coupled to a vehicle.

In some implementations, the method can include processing a fourth exposure frame during the second capture sequence, and generating a third HDR image from the third exposure frame and the fourth exposure frame at an end of the second capture sequence. The method can also include processing a fifth exposure frame during a third capture sequence that at least partially overlaps in time with the second capture sequence, and generating a fourth HDR image from the fourth exposure frame and the fifth exposure frame during the third capture sequence.

In some other implementations, the method can include generating movement information based on motion occurring after the second exposure frame is generated and before the third exposure frame is generated, and applying at least one of a motion estimation technique, a motion interpolation technique, or a motion prediction technique during the generation of the second HDR image based on the generated movement information. In some aspects, the method can also include applying the at least one of the motion estimation technique, motion interpolation technique, or motion prediction technique during the generation of the first HDR image based on motion occurring after the first exposure frame is generated and before the second exposure frame is generated. In other aspects, the method can also include refraining from applying at least one of the motion estimation technique, motion interpolation technique, or motion prediction technique during the generation of the first HDR image.

Another innovative aspect of the subject matter described in this disclosure can be implemented in an apparatus. In some implementations, the apparatus can include a memory and a processor coupled to the memory. The processor can be configured to process a first exposure frame and a second exposure frame during a first capture sequence, to generate a first HDR image from the first exposure frame and the second exposure frame at an end of the first capture sequence, to process a third exposure frame during a second capture sequence that at least partially overlaps in time with the first capture sequence, and to generate a second HDR image from the second exposure frame and the third exposure frame. In some aspects, each of the first exposure frame, the second exposure frame, and the third exposure frame is a line-based sensor exposure. In addition, or in the alternative, each of the first exposure frame, the second exposure frame, and the third exposure frame can be captured by a camera operationally coupled to a vehicle.

In some implementations, the processor can be configured to process a fourth exposure frame during the second capture sequence, and to generate a third HDR image from the third exposure frame and the fourth exposure frame at an end of the second capture sequence. The processor can also be configured to process a fifth exposure frame during a third capture sequence that at least partially overlaps in time with the second capture sequence, and to generate a fourth HDR image from the fourth exposure frame and the fifth exposure frame during the third capture sequence.

In some other implementations, the processor can be configured to generate movement information based on motion occurring after the second exposure frame is generated and before the third exposure frame is generated, and to apply at least one of a motion estimation technique, a motion interpolation technique, or a motion prediction technique during the generation of the second HDR image based on the generated movement information. In some aspects, the processor can also be configured to apply the at least one of the motion estimation technique, motion interpolation technique, or motion prediction technique during the generation of the first HDR image based on motion occurring after the first exposure frame is generated and before the second exposure frame is generated. In other aspects, the processor can be configured to apply at least one of the motion estimation technique, motion interpolation technique, or motion prediction technique during the generation of the first HDR image.

Another innovative aspect of the subject matter described in this disclosure can be implemented in a non-transitory computer-readable storage medium. The non-transitory computer-readable storage medium can include instructions that, when executed by one or more processors of an apparatus, cause the apparatus to perform a number of operations. The number of operations may include processing a first exposure frame and a second exposure frame during a first capture sequence, generating a first HDR image from the first exposure frame and the second exposure frame at an end of the first capture sequence, processing a third exposure frame during a second capture sequence that at least partially overlaps in time with the first capture sequence, and generating a second HDR image from the second exposure frame and the third exposure frame. In some aspects, each of the first exposure frame, the second exposure frame, and the third exposure frame is a line-based sensor exposure. In addition, or in the alternative, each of the first exposure frame, the second exposure frame, and the third exposure frame can be captured by a camera operationally coupled to a vehicle.

In some implementations, the number of operations can include processing a fourth exposure frame during the second capture sequence, and generating a third HDR image from the third exposure frame and the fourth exposure frame at an end of the second capture sequence. The number of operations can also include processing a fifth exposure frame during a third capture sequence that at least partially overlaps in time with the second capture sequence, and generating a fourth HDR image from the fourth exposure frame and the fifth exposure frame during the third capture sequence.

In some other implementations, the number of operations can include generating movement information based on motion occurring after the second exposure frame is generated and before the third exposure frame is generated, and applying at least one of a motion estimation technique, a motion interpolation technique, or a motion prediction technique during the generation of the second HDR image based on the generated movement information. In some aspects, the number of operations can also include applying the at least one of the motion estimation technique, motion interpolation technique, or motion prediction technique during the generation of the first HDR image based on motion occurring after the first exposure frame is generated and before the second exposure frame is generated. In other aspects, the number of operations can also include refraining from applying at least one of the motion estimation technique, motion interpolation technique, or motion prediction technique during the generation of the first HDR image.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numerals refer to corresponding parts throughout the drawing figures.

DETAILED DESCRIPTION

Figure 1:
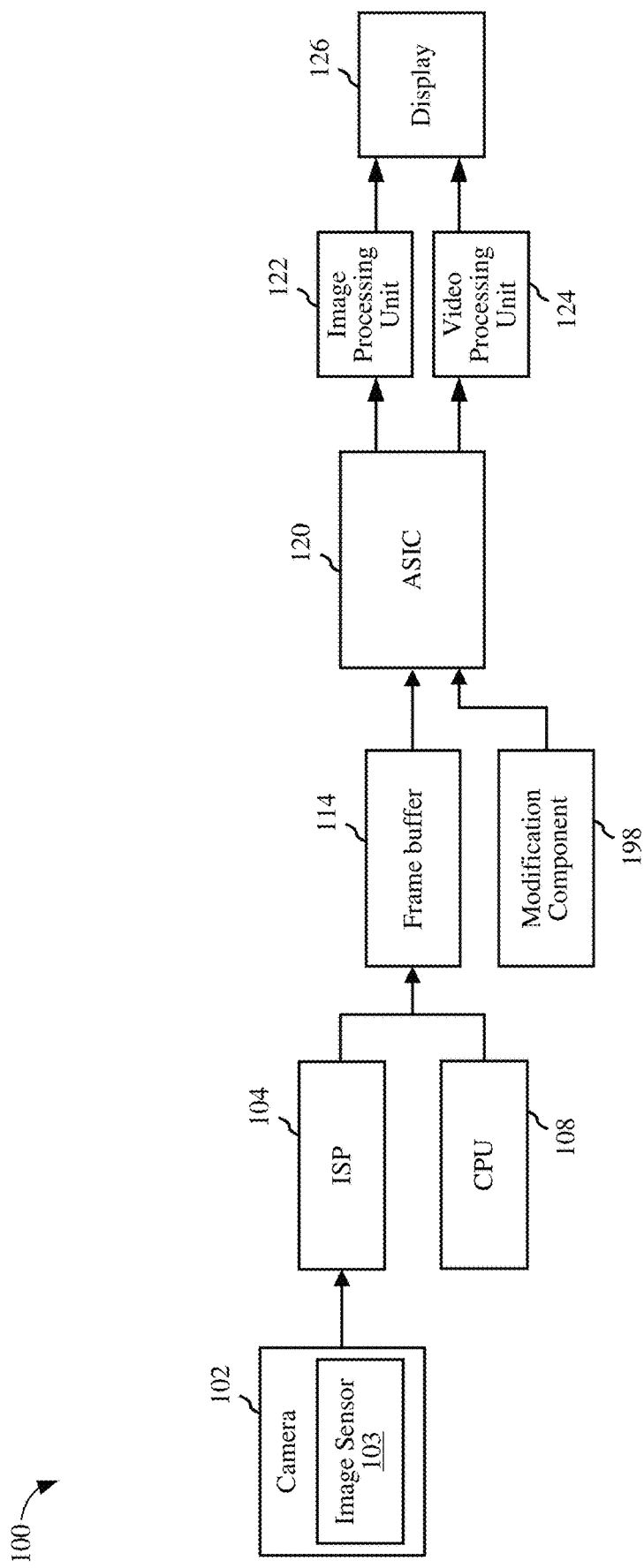
FIG. 1 shows a block diagram of an example device configured for high dynamic range (HDR) processing, according to some implementations.

The following description is directed to certain implementations for the purposes of describing the innovative aspects of this disclosure. However, a person having ordinary skill in the art will readily recognize that the teachings herein can be applied in a multitude of different ways. Aspects of the present disclosure relate to a camera that captures and processes one or more exposure frames of a scene and generates one or more high dynamic range (HDR) images of the scene from the exposure frames.

For purposes of discussion herein, "content" may refer to one or more of image content, HDR content, video content, graphical content, and display content, and "image content" or "video content" may refer to any content generated by a processing unit that performs image or video processing. For example, the phrases "image content" or "video content" may refer to content generated by one or more processes of an image or video processing system. "Image content" or "video content" may refer to content generated by an image signal processor (ISP) or a central processing unit (CPU). "Display content" may refer to any content generated by a processing unit that performs display processing, any content generated by a display processing unit, or any image or video content that may be processed for display. For example, an ISP or a CPU may output image or video content, such as a frame, to a frame buffer. The display processing unit may read the image or video content when retrieving one or more frames from the frame buffer and then perform one or more display processing techniques on the frames to generate display content. For example, a display processing unit may composite one or more frames (or layers) to generate a single frame, or compose, blend, fuse, or otherwise combine two or more layers into a single frame, or upscale or downscale a frame. For purposes of discussion herein, a "frame" may refer to a single frame or to two or more frames fused into one frame. For purposes of discussion herein, "exposure length" and "exposure time" may be used interchangeably.

As mentioned above, some devices may use staggered HDR processing techniques to capture multiple exposure frames within less than a frame time (or "capture sequence"), and then fuse together the multiple exposure frames to generate an HDR image. Although conventional staggered HDR processing techniques may process exposure frames having different exposure lengths (such as one short exposure and one long exposure) to generate one HDR image per captured sequence, these conventional staggered HDR processing techniques generate at most one HDR image (or "frame") per capture sequence, and thus may wait for a relatively long exposure to finish before processing a subsequent relatively short exposure frame.

Rather than waiting for one exposure to finish before processing a subsequent exposure, aspects of the present disclosure may allow processing relatively long exposures from a first sequence concurrently (or at least partially overlapping in time) with relatively short exposures from the next sequence. In this manner, devices employing various aspects of the present disclosure may generate more HDR images per capture sequence than conventional devices by decreasing frame output latencies while also increasing the frame rate. In some implementations, devices employing various aspects of the present disclosure can generate two times as many HDR images during a given image capture sequence as a conventional HDR processing device. For example, while a conventional HDR processing device may generate HDR images at a rate of 15 FPS, devices employing various aspects of the present disclosure may generate HDR images at a frame rate of 30 FPS (or higher).

In some implementations, a staggered HDR processing device disclosed herein can not only generate one HDR image for each pair of consecutive exposure frames within a capture sequence, but can also generate one HDR image for each pair of consecutive exposure frames across two consecutive capture sequences. In this manner, the staggered HDR processing devices disclosed herein may operate at a considerably higher frame rate when generating staggered HDR images as compared with conventional staggered HDR processing devices. As mentioned above, for certain applications, such as an HDR camera used by a self-driving vehicle, the higher frame rate could mean the difference between life and death for passengers, pedestrians, or animals. In some implementations, the staggered HDR processing devices disclosed herein may apply at least one of a motion estimation technique, a motion interpolation technique, or a motion prediction technique between exposures from different capture sequences. In this manner, the device may also compensate for motion blur (such as ghosting and artifacts) caused by motion between exposure frames, as is further described below.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processes, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as cameras, security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one camera, one smartphone, one controller, one processing system, and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific implementations. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

FIG. 1 shows a block diagram of an example device 100 configured for HDR processing, according to some implementations. The device 100 may include a camera 102, an image signal processor (ISP) 104, a central processing unit (CPU) 108, a frame buffer 114, an application-specific integrated circuit (ASIC) 120, an image processing unit 122, a video processing unit 124, and a display 126. In some implementations, the device 100 may also include a modification component 198. The camera 102 may include an image sensor 103, and may generate frames (such as for HDR images) via a variety of HDR processing techniques including (but not limited to) snapshot processing, zig zag processing, spatial processing, staggered processing, or any other suitable type of image or HDR processing. The ISP 104 may process frames provided by the camera 102, and the processed frames may be stored or saved in one or more of the frame buffer 114, a system memory, and an internal memory (such as a dynamic random-access memory (DRAM)). In some implementations, the ASIC 120 may be part of, or contained in, the CPU 108. In some other implementations, the device 100 may not include the ASIC 120. In some implementations, the image processing unit 122 and the video processing unit 124 may be a single graphics processing unit (GPU).

In some implementations, the CPU 108 may run or perform a variety of algorithms for the device 100. The CPU 108 may also include one or more components or circuits for performing various functions described herein. For example, the CPU 108 may include one or more of a processing unit, a content encoder, a system memory, and a communication interface, which are not shown for simplicity. One or more of the processing unit, the content encoder, the system memory, and the communication interface may additionally include an internal memory. The processing unit or content encoder may receive a value for each component, e.g., each color component of one or more pixels of image or video content. For example, a pixel in the red (R), green (G), blue (B) (RGB) color space may include a first value for the R component, a second value for the G component, and a third value for the B component. The system memory or internal memory may include one or more volatile or non-volatile memories or storage devices. In some aspects, the system memory or the internal memory may include a RAM, a static RAM (SRAM), a DRAM, an erasable programmable read-only memory (EPROM), an electrically erasable programmable ROM (EEPROM), a flash memory, a magnetic data media, an optical storage media, or any other suitable memory.

The system memory or internal memory may also be a non-transitory storage medium, according to some implementations. The term "non-transitory" may indicate that the storage medium is not embodied in a carrier wave or a propagated signal. However, the term "non-transitory" should not be interpreted to mean that the system memory or internal memory are non-movable or that its contents are static. As one example, the system memory or internal memory may be removed from the CPU 108 and moved to another component. As another example, the system memory or internal memory may not be removable from the CPU 108.

The CPU 108 may also include a processing unit, which may be an ISP, a GPU, an image processor, a video processor, or any other suitable processing unit for performing image or video processing. In some implementations, the processing unit may be integrated into a component of the CPU 108, such as a motherboard, or may be otherwise incorporated within a peripheral device for interoperating with the CPU 108. The processing unit of the CPU 108 may also include one or more processors, such as one or more ASICs, microprocessors, field programmable gate arrays (FPGAs), arithmetic logic units (ALUs), digital signal processors (DSPs), discrete logics, software, hardware, firmware, other equivalent integrated or discrete logic circuitry, or any combinations thereof. If the techniques described herein are implemented partially in software, the processing unit may store instructions for the software in a suitable, non-transitory computer-readable storage medium, e.g., a system memory or an internal memory, and may execute the instructions in hardware using one or more processors to perform the techniques described herein. Any of the foregoing, including hardware, software, or a combination of hardware and software, may be considered to be one or more processors.

In some implementations, the frame buffer 114 may store or save frames from the ISP 104 in a memory, such as a system memory or an internal memory. In addition, or in the alternative, the ASIC 120 may store, save, or process frames. In some aspects, the ASIC 120 may process the contents of the frame buffer 114, such as images or frames, after the ISP 104 processes the images or frames. The ASIC 120 may include a programmable engine, such as a processing unit or a GPU. In some aspects, the CPU 108 may include a system memory that may store or save contents of the frame buffer 114.

One or more of the image processing unit 122 and the video processing unit 124 may receive images or frames from the ASIC 120. The one or more of the image processing unit 122 and the video processing unit 124 may process or combine the frames, and then send the processed or combined frames to the display 126 for presentation to a user. In some aspects, the display 126 may include one or more of a variety of display devices, such as a liquid crystal display (LCD), a plasma display, an organic light emitting diode (OLED) display, a projection display device, an augmented reality display device, a virtual reality display device, a head-mounted display, and/or any other suitable display device. The display 126 may also include a single display or multiple displays, and thus reference to the display 126 may refer to one or more displays 126.

In some implementations, the display 126 may include a display processor that can be configured to perform further processing on the frames. More specifically, the display processor may be configured to perform one or more display processing techniques on frames captured or generated by the camera 102.

The modification component 198 may generate one or more exposure frames (not shown for simplicity) through a line-based exposure of an image sensor, such as the image sensor 103. In some implementations, the image sensor 103 may include a set of pixel elements. The modification component 198 may divide each exposure frame into one or more lines (or subsets of the set of pixel elements) and, for each line or subset, expose all of the line's or subset's pixels at the same time. Pixels in different lines or subsets of the exposure frame may be exposed at different times. In some aspects, the exposure frames may have at least two different exposure times and staggered line-based exposure times during the at least two different exposure times.

In some implementations, the modification component 198 may obtain movement information associated with the image sensor 103 from a gyroscope sensor (not shown for simplicity), and may modify the exposure frames based on the obtained movement information. Moreover, the modification component 198 may combine the exposure frames (such as two consecutive exposure frames) into a staggered HDR image. In some aspects, the described functionality of the modification component 198 may be performed by one or more of the CPU 108, the ISP 104, the ASIC 120, the image processing unit 122, the video processing unit 124, the camera 102, the display 126, or any other suitable image processing component.

In some aspects of HDR processing, multiple frames may be processed with different exposure times. For example, the multiple frames may have two or more exposure time intervals. In some aspects, the frames described herein may have an exposure time range of 1 millisecond (ms) to 30 ms (such as corresponding to a frame rate of 30 FPS). Frames within the exposure range may have different exposure times. For example, some frames may have a relatively short exposure time (such as 1 ms), and other frames may have a relatively long exposure time (such as 30 ms).

Although a number of separate components are illustrated in FIG. 1, one or more of the components may be implemented together or include additional functionality. All of the described components may not be required for the device 100, or the functionality of one or more components may be separated into separate components. Additional components not illustrated may also exist. Therefore, the examples described regarding FIG. 1 are for illustrative purposes, and various implementations of the subject matter disclosed herein are not limited to the example device 100.

Figure 2:
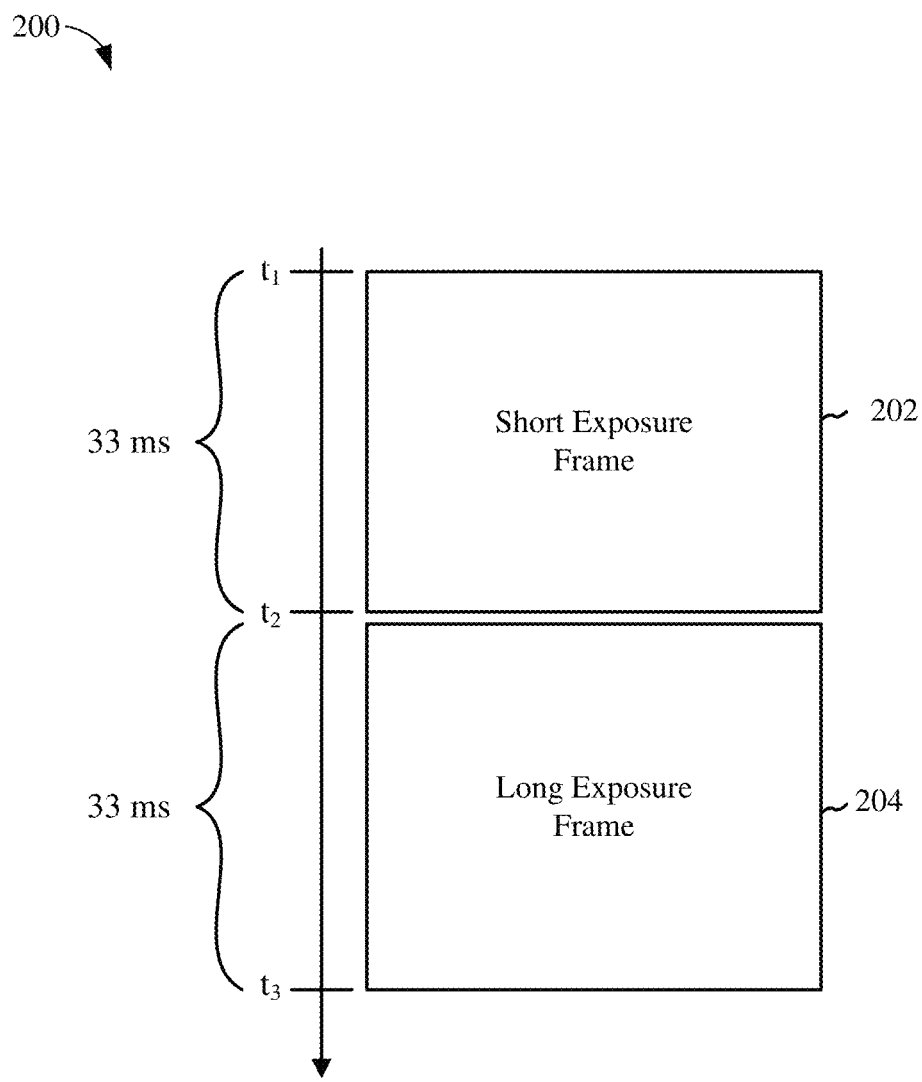
FIG. 2 shows a timing diagram depicting an example operation for HDR processing, according to some implementations.

FIG. 2 shows a timing diagram depicting an example operation 200 for HDR processing, according to some implementations. For the example operation 200, two different exposure frames are captured and processed sequentially, without staggering or overlapping the exposure frames. Although described with respect to the device 100 of FIG. 1, the example operation 200 may be performed by any suitable system, device, or camera (such as an HDR-capable camera). Referring also to FIG. 1, the image sensor 103 of the camera 102 may capture multiple exposures, which may be sequentially readout from the image sensor 103 such that pixels associated with each of the captured exposures are transferred from the image sensor 103 to the ISP 104 (or another suitable component of the device 100). For the example of FIG. 2, the image sensor 103 captures or generates a short exposure frame 202 having a relatively short exposure time, and thereafter captures or generates a long exposure frame 204 having a relatively long exposure time. In some aspects, the short exposure frame 202 has an exposure time of 1 ms, and the long exposure frame 204 has an exposure time of 30 ms.

More specifically, the device 100 begins processing the short exposure frame 202 at time $t_1$, and completes processing the short exposure frame 202 at time $t_2$. The device 100 begins processing the long exposure frame 204 at time $t_2$, and completes processing the long exposure frame 204 at time $t_3$. In this manner, the device 100 may sequentially capture and process the short exposure frame 202 and the long exposure frame 204 without staggering or overlapping the exposure frames 202 and 204. In some aspects, the time period between times $t_1$ and $t_2$ may be 33 ms, and the time period between times $t_2$ and $t_3$ may be 33 ms.

Figure 3:
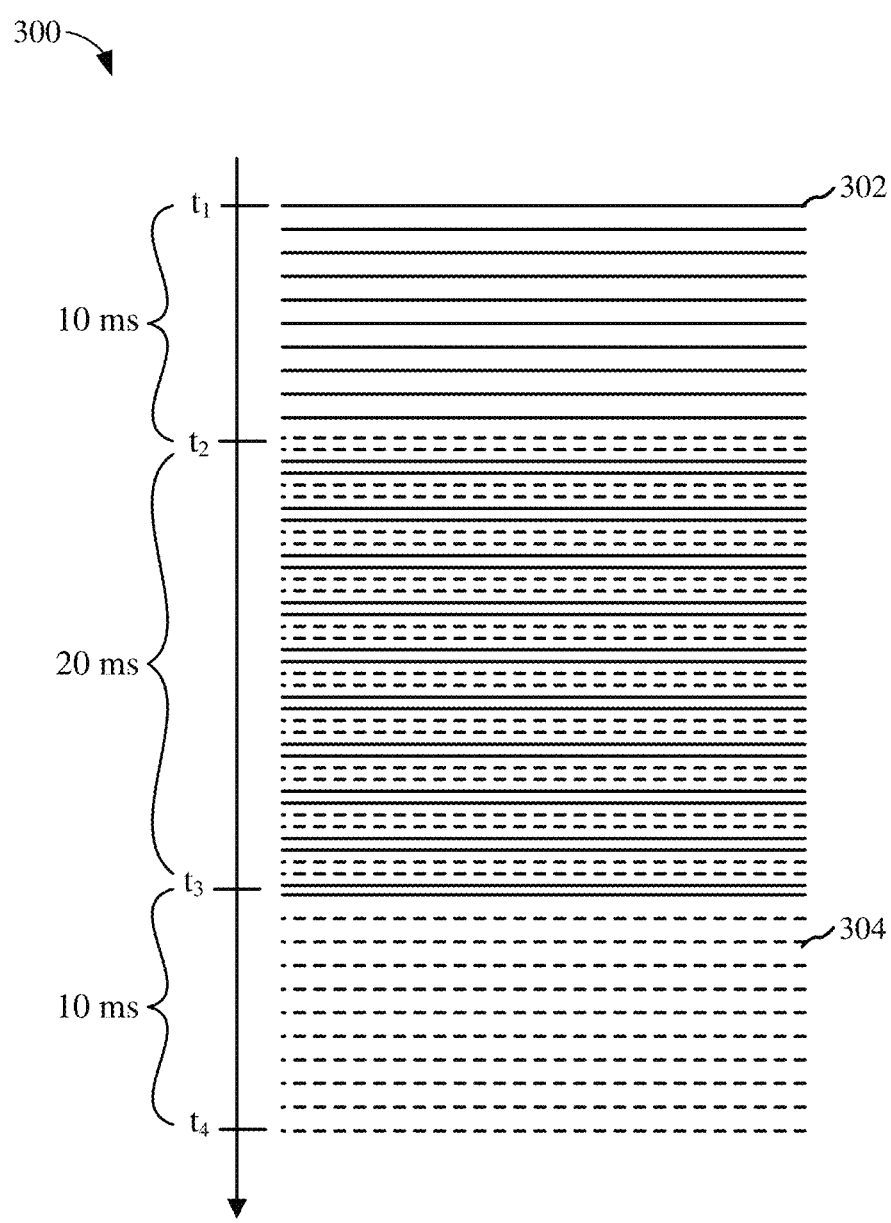
FIG. 3 shows a timing diagram depicting an example operation for HDR processing, according to other implementations.

FIG. 3 shows a timing diagram depicting an example operation 300 for HDR processing, according to other implementations. Although described with respect to the device 100 of FIG. 1, the example operation 300 may be performed by any suitable system, device, or camera (such as an HDR-capable camera). For the example operation 300, the device 100 uses staggered HDR processing techniques to process at least some portions of different exposure frames concurrently, for example, by overlapping in time the processing of a short exposure frame and the processing of a long exposure frame. In some implementations, the device 100 may generate short exposure frames through the short exposure lines 302 (shown as solid lines), and may generate long exposure frames through the long exposure lines 304 (shown as dashed lines). As depicted in the example operation 300, between times $t_1$ and $t_2$ the device 100 processes only the short exposure lines 302 to generate the short exposure frame. Between times $t_2$ and $t_3$, the device 100 concurrently processes both the short exposure lines 302 and the long exposure lines 304 in a staggered manner to generate the short exposure frame and the long exposure frame, respectively. At time $t_3$, the device 100 finishes processing the short exposure lines 302, and continues to process the long exposure lines 304 to generate the long exposure frame. Thus, between times $t_3$ and Li, the device 100 processes only the long exposure lines 304 and completes the generation of the long exposure frame. In some aspects, the time period between times $t_1$ and $t_2$ may be 10 ms, the time period between times $t_2$ and $t_3$ may be 20 ms, and the time period between times $t_3$ and $t_4$ may be 10 ms.

Generation of the short exposure frame overlaps in time with generation of the long exposure frame between times $t_2$ and $t_3$. In some implementations, the device 100 may stagger the short exposure lines 302 and the long exposure lines 304 during the overlapping time period between times $t_2$ and $t_3$. As shown, the device 100 staggers the short exposure lines 302 and the long exposure lines 304 once every two lines during the overlapping time period. In other implementations, the device 100 may stagger the short exposure lines 302 and the long exposure lines 304 in any other suitable manner during the overlapping time period.

The short exposure frame generated from the short exposure lines 302 may have a relatively short frame exposure time, and the long exposure frame generated from the long exposure lines 304 may have a relatively long frame exposure time. The short exposure lines 302 may be separated from each other by a first duration $\Delta_1$, and the long exposure lines 304 may be separated from each other by a second duration $\Delta_2$. In implementations for which the short exposure frame has an exposure time of 10 ms and the long exposure frame has an exposure time of 30 ms, the device 100 can generate both the short and long exposure frames within approximately 40 ms. Further, in implementations for which the first duration $\Delta 1$ and the second duration $\Delta 2$ are each 10 µs, the device 100 can process 3,000 exposure lines for a long exposure frame in approximately 30 ms, and can process 3,000 exposure lines for a short exposure frame in approximately 10 ms. Thus, by processing the short exposure lines 302 and the long exposure lines 304 in a staggered manner (such that at least a portion of the short exposure lines 302 and the long exposure lines 304 are processed concurrently), the device 100 can process a total of 6,000 exposure lines in 40 ms (such as between times $t_1$ and $t_4$).

As discussed above, the start of the long exposure lines 304 is offset in time from the start of the short exposure lines 302 by 10 ms (as indicated by the time period between times $t_1$ and $t_2$), which may be shorter in duration than similar time offsets associated with non-staggered HDR processing techniques. The shorter time offset durations associated with staggered HDR processing techniques may be suitable for fast moving cameras such as, for example, cameras used by autonomous vehicles for object detection and collision avoidance.

Figure 4:
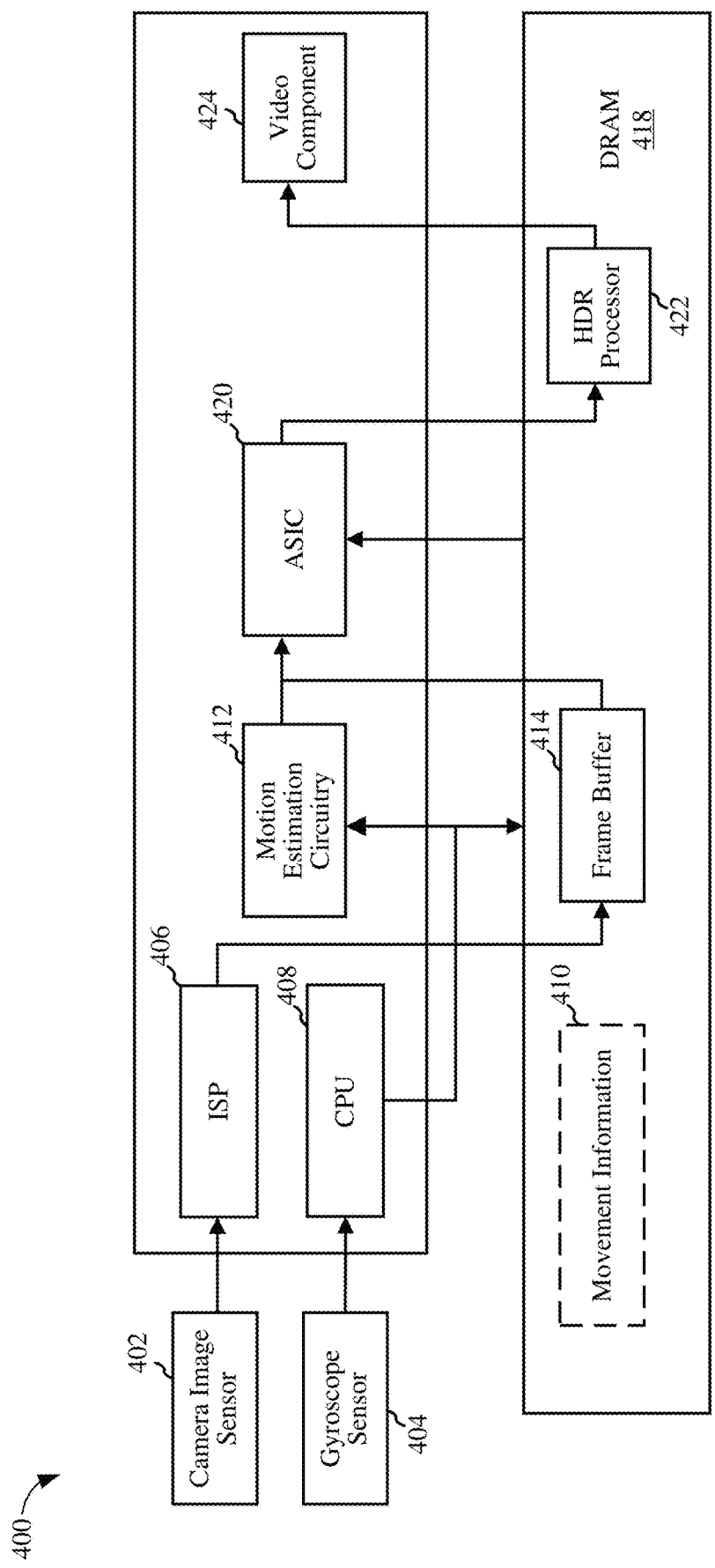
FIG. 4 shows a block diagram of another example device configured for HDR processing, according to some other implementations.

FIG. 4 shows a block diagram of an example device 400 configured for HDR processing, according to some other implementations. As shown in FIG. 4, the device 400 includes a camera image sensor 402, a gyroscope sensor 404, an ISP 406, a CPU 408, a frame buffer 414, a DRAM 418, an ASIC 420, an HDR processor 422, and a video component 424. The device 400 may be one example implementation of the HDR processing device 100 of FIG. 1, and one or more of the components of the device 400 may operate similarly to the corresponding components described with respect to FIG. 1. In some implementations, the frame buffer 414 may include more than one frame buffer, such as a short frame buffer to buffer relatively short exposure frames and a long frame buffer to buffer relatively long exposure frames. Although not shown in FIG. 4 for simplicity, the device 400 may include the modification component 198 of FIG. 1 for fusing or otherwise manipulating exposure frames and/or HDR images.

The camera image sensor 402 may capture and generate multiple frames of a scene through a line-based exposure. In some implementations, the multiple frames generated by the camera image sensor 402 may have two or more different exposure times (such as a short exposure time and a long exposure time). In some aspects, the multiple frames may have staggered line-based exposure times during some or all of the different exposure times, for example, to facilitate staggered HDR processing. Although multiple frames may have different exposure times, it will be appreciated that the multiple frames may have the same "pixel-transfer time," during which pixel data is transferred from the camera image sensor 402 to the ISP 406. The pixel-transfer time may be fixed for each exposure frame according to a frame rate of the camera image sensor 402. In an example embodiment, the pixel-transfer time may be approximately 16.667 ms.

The gyroscope sensor 404 may detect motion in the scene and generate movement information associated with one or more of the multiple frames generated by the camera image sensor 402. The gyroscope sensor 404 may operate in a staggered HDR mode to generate movement information based on staggered line-based frame exposures. In some implementations, the gyroscope sensor 404 may generate movement information based on angular motion of the device 400, for example, by using a rotation of the device 400 to generate movement information, and then apply at least one of a motion estimation technique, a motion interpolation technique, or a motion prediction technique during generation of one or more HDR images based on the generated movement information. For example, the gyroscope sensor 404 may generate movement information based on motion occurring after one exposure frame is generated and before a next exposure frame is generated.

The movement information 410 provided by the gyroscope sensor 404 (or at least a portion of the movement information) may be stored in the DRAM 418. The motion estimation circuitry 412 may process movement information provided by the gyroscope sensor 404, and provide the processed movement information to the ASIC and/or the DRAM 418. In some implementations, the motion estimation circuitry 412 may be implemented as an ASIC or other dedicated circuit. In other implementations, the motion estimation circuitry 412 may be implemented using one or more processors executing instructions stored in memory. In some aspects, the CPU 408 and the DRAM 418 may operate to process the movement information provided by the gyroscope sensor 404, thereby performing the functions of the motion estimation circuitry 412. One or more of the CPU 408 and the DRAM 418 may send such motion information to the ASIC 420, and at least one of the ASIC 420 and the HDR processor 422 may apply a motion technique to improve one or more HDR images generated from the exposure frames, as further described with respect to FIG. 5.

In some implementations, the HDR processor 422 may obtain image data from the ASIC 420, and may perform HDR processing on the image data to generate one or more staggered HDR images, for example, by fusing together two or more consecutive exposure frames received from the ASIC 420. The video component 424 may receive the HDR images and/or the exposure frames from the HDR processor 422. In some other implementations, the video component 424 may fuse the exposure frames into a staggered HDR image. In some aspects, the video component 424 may generate HDR video from the generated HDR images. In some implementations, the video component 424 may send the HDR images to a display, which is not shown for simplicity.

Figure 5:
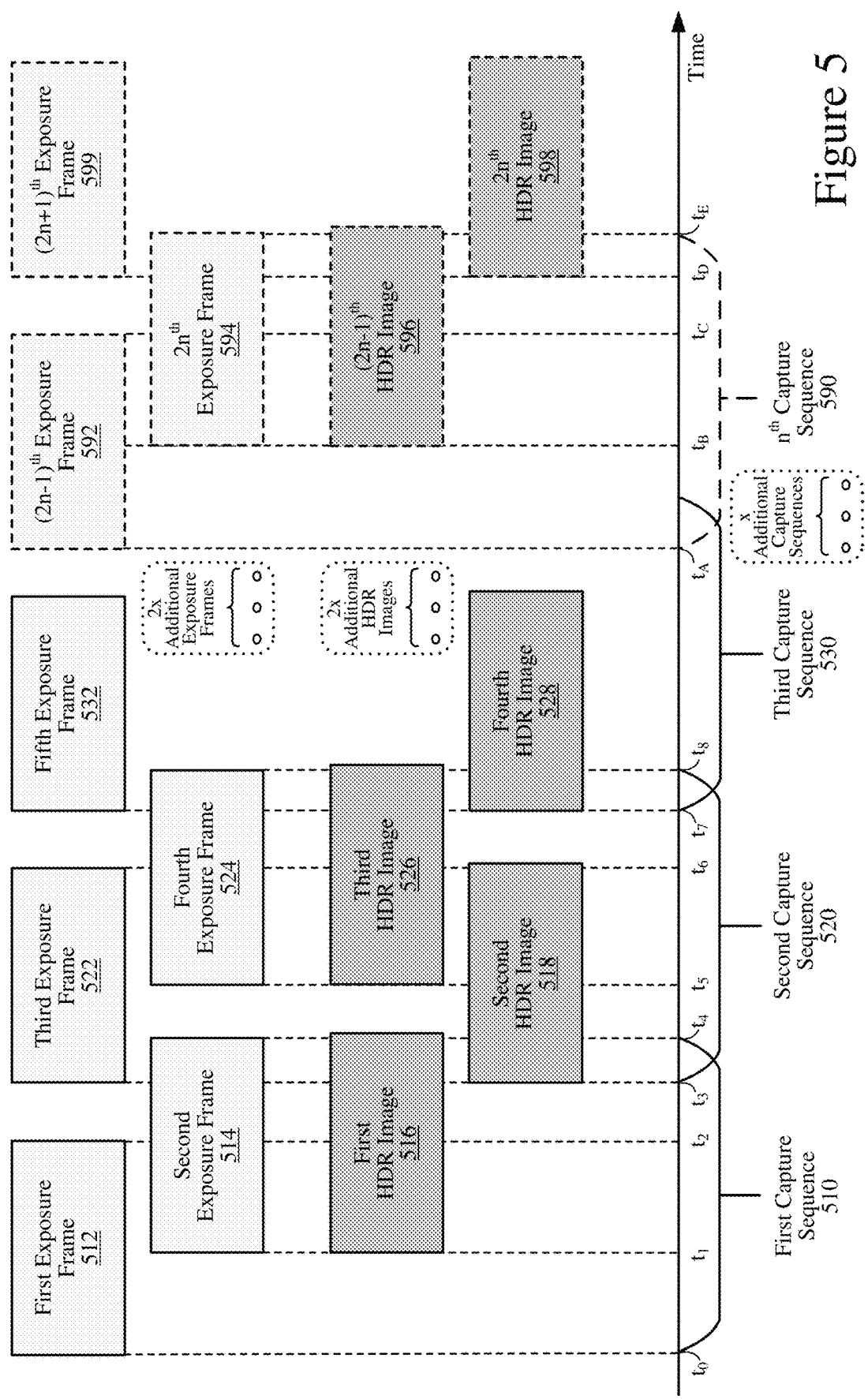
FIG. 5 shows a timing diagram depicting an example operation for HDR processing, according to some other implementations.

FIG. 5 shows a timing diagram depicting an example operation for HDR processing, according to some other implementations. Although described with respect to the device 400 of FIG. 4, in other implementations, the example operation may be performed by the device 100 of FIG. 1, or by any device that can capture and process one or more exposure frames of a scene and generate one or more HDR images of the scene from the exposure frames during an image capture sequence.

At time $t_0$, the device 400 begins processing a first exposure frame 512 during a first capture sequence 510. At time $t_1$, the device 400 may begin processing a second exposure frame 514, and may also begin generating a first HDR image 516 from the first exposure frame 512 and the second exposure frame 514. At time $t_2$, the device 400 may finish processing the first exposure frame 512 during the first capture sequence 510. Thus, in some implementations, the processing of the second exposure frame 514 may at least partially overlap in time with the processing of the first exposure frame 512 (such as between times $t_1$ and time $t_2$).

At time $t_3$, the device 400 begins processing a third exposure frame 522. Also at time $t_3$, the device 400 begins generating a second HDR image 518 from the second exposure frame 514 and the third exposure frame 522. Also at time $t_3$, the device 400 may begin a second capture sequence 520 that at least partially overlaps in time with the first capture sequence 510. For the example of FIG. 5, the first capture sequence 510 overlaps with the second capture sequence 520 between times $t_3$ and Li.

At time $t_4$, the device 400 may finish processing the second exposure frame 514 during the first capture sequence 510, for example, such that the processing of the third exposure frame 522 at least partially overlaps in time with the processing of the second exposure frame 514 (such as between times $t_3$ and $t_4$). Also at time $t_4$, the device 400 may finish generating the first HDR image 516 at an end of the first capture sequence 510.

In some implementations, one or more of the exposure frames depicted in FIG. 5 may be line-based sensor exposures, which may allow the device 400 to generate staggered HDR images. In such implementations, the device 400 may generate the exposure frames through a line-based exposure of an image sensor (such as the image sensor 103 of FIG. 1) including a set of pixel elements. The device 400 may divide each exposure frame into one or more subsets of the set of pixel elements and, for each subset, expose all of the subset's pixels at the same time. For example, the first exposure frame 512, the second exposure frame 514, the third exposure frame 522, and the fourth exposure frame 524 may be line-based exposures, and the device 400 may generate each of the first HDR image 516 and the second HDR image 518 in a staggered (alternating lines or pixel subsets) manner. As a non-limiting example, the device 400 may capture the first exposure frame 512 using a first subset of the set of pixel elements (not shown for simplicity) in the image sensor, the second exposure frame 514 using a second subset of the set of pixel elements (not shown for simplicity), and the third exposure frame 522 using a third subset of the set of pixel elements (not shown for simplicity). Additionally, the device 400 may generate the first HDR image 516 and the second HDR image 518 simultaneously, such as between times $t_3$ and $t_4$.

At time $t_5$, the device 400 may begin processing a fourth exposure frame 524. Also at time $t_5$, the device 400 may begin generating a third HDR image 526 from the third exposure frame 522 and the fourth exposure frame 524. At time $t_6$, the device 400 may finish processing the third exposure frame 522 during the second capture sequence 520. Also at time $t_6$, the device 400 may finish generating the second HDR image 518.

At time $t_7$, the device 400 may begin processing a fifth exposure frame 532. Also at time $t_7$, the device 400 may begin generating a fourth HDR image 528 from the fourth exposure frame 524 and the fifth exposure frame 532. Also at time $t_7$, the device 400 may begin a third capture sequence 530 that at least partially overlaps in time with the second capture sequence 520.

At time $t_8$, the device 400 may finish processing the fourth exposure frame 524 during the second capture sequence 520. Also at time $t_8$, the device 400 may finish generating the third HDR image 526 at an end of the second capture sequence 520. The device 400 may finish processing the fifth exposure frame 532 (not shown for simplicity) during the third capture sequence 530. The device 400 may also finish generating the fourth HDR image 528 (not shown for simplicity) during the third capture sequence 530.

The device 400 may then perform any number, x, of additional capture sequences. During each additional capture sequence, the device 400 may process two additional exposure frames and generate two additional HDR images. In this manner, the device 400 may process 2x additional exposure frames and generate 2x additional HDR images during the x additional capture sequences. In some implementations, when the total number of capture sequences is less than three, x may be equal to zero.

After processing the x additional capture sequences, the device 400 may begin an $n^{th}$ capture sequence 590, where n is equal to the total number of capture sequences. The $n^{th}$ capture sequence 590 may at least partially overlap with an $(n-1)^{th}$ capture sequence, which is not shown for simplicity. At time $t_A$, the device 400 may begin the $n^{th}$ capture sequence 590. Also at time $t_A$, the device 400 may begin processing a $(2n-1)^{th}$ exposure frame 592, and the device 400 may continue generating a $(2n-2)^{th}$ HDR image (not shown for simplicity) from a $(2n-2)^{th}$ exposure frame (not shown for simplicity) and the $(2n-1)^{th}$ exposure frame 592.

At time $t_B$, the device 400 may begin processing an $2n^{th}$ exposure frame 594. Also at time $t_B$, the device 400 may begin generating an $(2n-1)^{th}$ HDR image 596 from the $(2n-1)^{th}$ exposure frame 592 and the $2n^{th}$ exposure frame 594. At time $t_C$, the device 400 may finish processing the $(2n-1)^{th}$ exposure frame 592 during the $n^{th}$ capture sequence 590. At time $t_D$, the device 400 may being processing a $(2n+1)^{th}$ exposure frame 599. Also at time $t_D$, the device 400 may begin generating a $2n^{th}$ HDR image 598 from the $2n^{th}$ exposure frame 594 and the $(2n+1)^{th}$ exposure frame 599. After time $t_D$, the device 400 may begin processing an $(2n+2)^{th}$ exposure frame (not shown for simplicity), and the device 400 may continue generating the $2n^{th}$ HDR image 598 from the $2n^{th}$ exposure frame 594 and the $(2n+2)^{th}$ exposure frame. At time $t_E$, the device 400 may finish processing the $2n^{th}$ exposure frame 594 during the $n^{th}$ capture sequence 590. Also at time $t_E$, the device 400 may finish generating the $(2n-1)^{th}$ HDR image 596 at an end of the $n^{th}$ capture sequence 590, i.e., time $t_E$.

Thus, in addition to generating one HDR image for each pair of consecutive exposure frames that occur within a given capture sequence, the device 400 may also generate one HDR image for each pair of consecutive exposure frames that occur across two consecutive capture sequences. Accordingly, the device 400 may operate at a considerably higher frame rate when generating staggered HDR images, for example, as compared with a conventional staggered HDR processing device. In this manner, the device 400 may generate HDR images at two (or more) times the rate of a conventional staggered HDR processing device.

In some implementations, motion in the scene may occur during a non-overlapping period between two consecutive exposure frames. For example, motion may occur between a first time at which the device 400 finishes processing the second exposure frame 514 (such as at time $t_4$) and a second time at which the device finishes processing the third exposure frame 522 (such as at time $t_6$). In some implementations, the device 400 may generate movement information based on motion occurring during the non-overlapping period. In this example, the device 400 may generate movement information based on motion occurring after the second exposure frame 514 is generated and before the third exposure frame 522 is generated. In some implementations, the device 400 may apply at least one of a motion estimation technique, a motion interpolation technique, or a motion prediction technique during the generation of the corresponding HDR image (which would be the second HDR image 518 in this example) based on the generated movement information. In some other implementations, the device 400 may refrain from applying at least one of the motion estimation technique, the motion interpolation technique, or the motion prediction technique during generation of the first HDR image 516.

It will be understood that the device 400 may begin-or-finish capturing and processing particular exposure frames or generating particular HDR images earlier or later than as shown in the example operation 500. For example, the device 400 may begin processing the first exposure frame 512 at a time between time to and time $t_1$. Similarly, the duration for which the device 400 processes particular exposure frames or generates particular HDR images may be longer or shorter than as shown in the example operation. For example, the device 400 may finish processing the first exposure frame 512 at a time between time $t_1$ and time $t_2$. In some implementations, each capture sequence may have a suitable duration (such as 40 ms) for capturing and processing two exposure frames. One of the exposure frames within each capture sequence may have a relatively short exposure duration (such as 1 ms), while the other of the exposure frames within each capture sequence may have a relatively long exposure duration (such as 30 ms).

In some implementations, the device 400 may capture and generate three (or more) exposure frames per capture sequence, such as one short exposure frame, one medium exposure frame, and one long exposure frame. In such implementations, the device 400 may generate one HDR image for each pair of consecutive exposure frames both within and across capture sequences. In this manner, the device 400 may generate HDR images at three (or more) times the rate of a conventional staggered HDR processing device.

Figure 6:
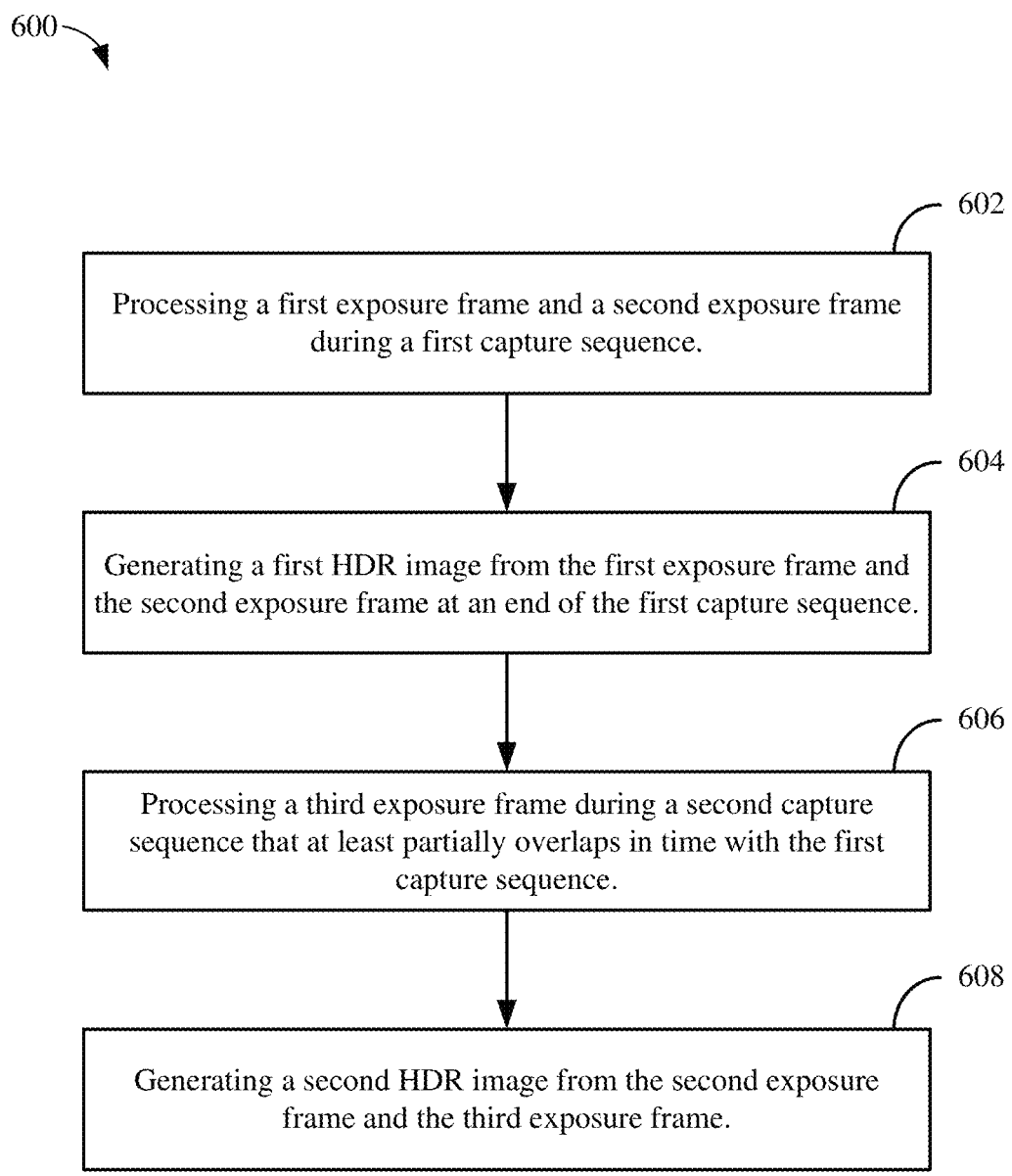
FIG. 6 shows a flowchart illustrating an example operation for HDR processing, according to some implementations.

FIG. 6 shows a flowchart illustrating an example operation 600 for HDR processing, according to some implementations. The operation 600 may be performed by the device 100 of FIG. 1, the device 400 of FIG. 4, or any other device suitable for staggered HDR processing. In some implementations, the operation 600 begins in block 602 with processing a first exposure frame and a second exposure frame during a first capture sequence. In block 604, the operation 600 proceeds with generating a first HDR image from the first exposure frame and the second exposure frame at an end of the first capture sequence. In block 606, the operation 600 proceeds with processing a third exposure frame during a second capture sequence that at least partially overlaps in time with the first capture sequence. In block 608, the operation 600 proceeds with generating a second HDR image from the second exposure frame and the third exposure frame.

Figure 7A:
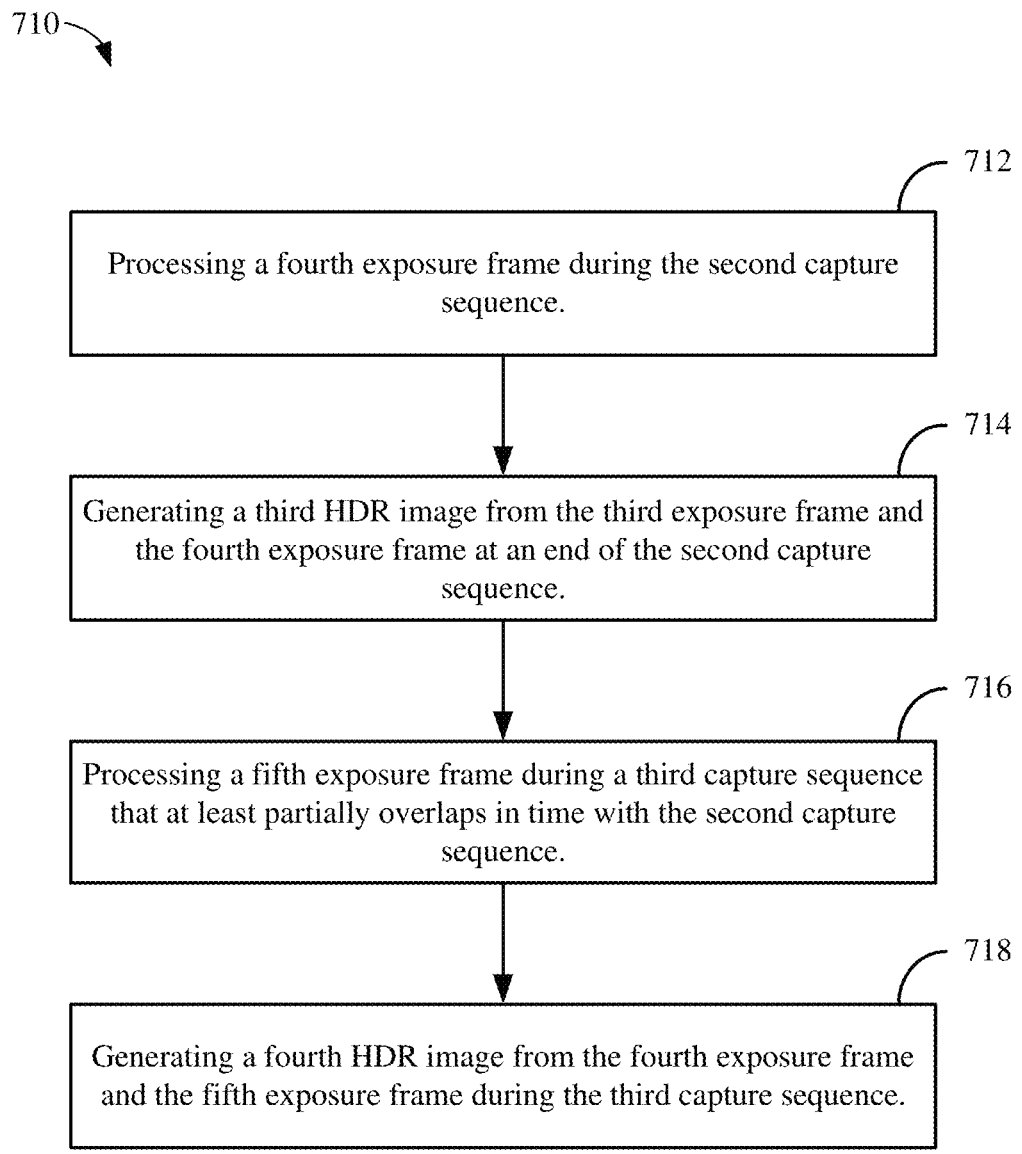
FIG. 7A shows a flowchart illustrating another example operation for HDR processing, according to some implementations.

FIG. 7A shows a flowchart illustrating an example operation 710 for HDR processing, according to other implementations. The operation 710 may be performed by the device 100 of FIG. 1, the device 400 of FIG. 4, or any other device suitable for staggered HDR processing. In some implementations, the operation 710 of FIG. 7A may begin after generating the second HDR image block 608 of FIG. 6. The operation 710 begins in block 712 with processing a fourth exposure frame during the second capture sequence. In block 714, the operation 710 proceeds with generating a third HDR image from the third exposure frame and the fourth exposure frame at an end of the second capture sequence. In block 716, the operation 710 proceeds with processing a fifth exposure frame during a third capture sequence that at least partially overlaps in time with the second capture sequence. In block 718, the operation 710 proceeds with generating a fourth HDR image from the fourth exposure frame and the fifth exposure frame during the third capture sequence.

Figure 7B:
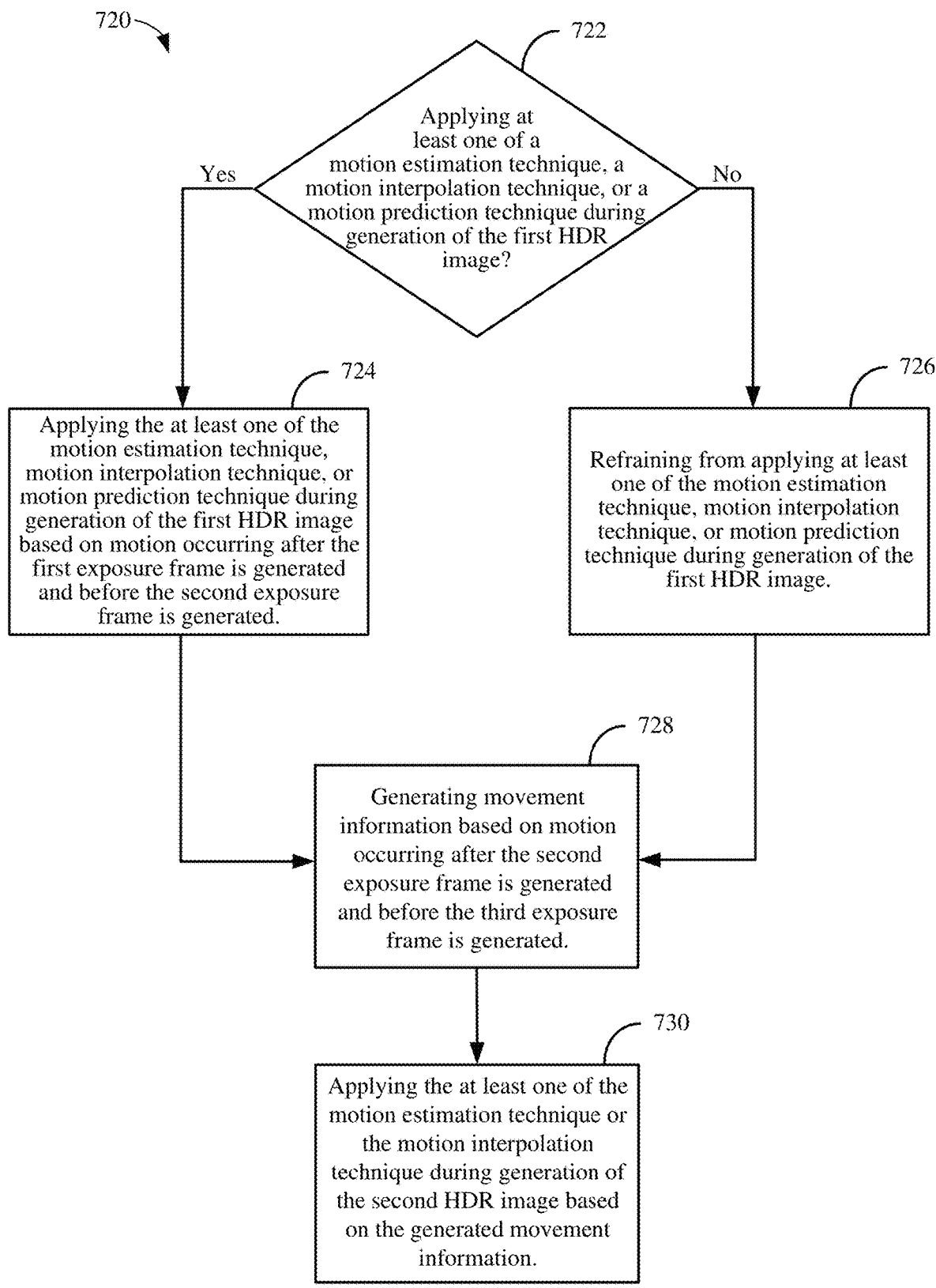
FIG. 7B shows a flowchart illustrating another example operation for HDR processing, according to some implementations.

FIG. 7B shows a flowchart illustrating an example operation 720 for HDR processing according to some other implementations. The operation 720 may be performed by the device 100 of FIG. 1, the device 400 of FIG. 4, or any other device suitable for staggered HDR processing. In some implementations, the operation 720 of FIG. 7B may begin before processing the first exposure frame and the second exposure frame in block 602 of FIG. 6. In some other implementations, the operation 720 of FIG. 7B may begin after processing the first exposure frame and the second exposure frame in block 602 of FIG. 6. The operation 720 begins in block 722 with determining whether to apply at least one of a motion estimation technique, a motion interpolation technique, or a motion prediction technique during generation of the first HDR image. If Yes, in block 724, the operation 720 proceeds with applying the at least one motion estimation technique, motion interpolation technique, or motion prediction technique during the generation of the first HDR image based on motion occurring after the first exposure frame is generated and before the second exposure frame is generated. If No not, in block 726, the operation 720 instead proceeds with refraining from applying at least one of the motion estimation technique, motion interpolation technique, or motion prediction technique during the generation of the first HDR image. In block 728, the operation 720 proceeds with generating movement information based on motion occurring after the second exposure frame is generated and before the third exposure frame is generated. In block 730, the operation 720 proceeds with applying the at least one motion estimation technique, motion interpolation technique, or motion prediction technique during the generation of the second HDR image based on the generated movement information.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, an FPGA or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification can also be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of high dynamic range (HDR) processing, comprising:
    causing an image sensor to receive a first frame of image data and a second frame of image data at a capture frame rate;
    receiving the first frame of image data from the image sensor, the first frame of image data including a first subset of pixel data associated with a first exposure duration and a second subset of pixel data associated with a second exposure duration, the second exposure duration being greater than the first exposure duration;
    generating a first HDR image from the first subset of pixel data and the second subset of pixel data;
    receiving the second frame of image data from the image sensor, the second frame of image data including a third subset of pixel data associated with a third exposure duration and a fourth subset of pixel data associated with a fourth exposure duration, the fourth exposure duration being greater than the third exposure duration, the third exposure duration beginning subsequent to the first exposure duration and the fourth exposure duration beginning subsequent to each of the first exposure duration and the second exposure duration;
    generating a second HDR image from the second subset of pixel data and the third subset of pixel data;
    generating a third HDR image from the third subset of pixel data and the fourth subset of pixel data; and
    outputting the first HDR image, the second HDR image, and the third HDR image as a video, the video having a higher frame rate than the capture frame rate.

2. The method of claim 1, wherein the first subset of pixel data is received by a first plurality of lines of the image sensor and where the second subset of pixel data is received from a second subset of lines of the image sensor.

3. The method of claim 2, wherein the first HDR image, the second HDR image, and the third HDR image are staggered HDR images.

4. The method of claim 3, wherein the first subset of pixel data is captured using a first subset of pixel elements in the image sensor, wherein the second subset of pixel data is captured using a second subset of pixel elements in the image sensor.

5. The method of claim 2, wherein the third subset of pixel data is received by the first plurality of lines of the image sensor and wherein the fourth subset of pixel data is received by the second plurality of lines of the image sensor.

6. The method of claim 1, further comprising:
    applying at least one of a motion estimation technique, a motion interpolation technique, or a motion prediction technique during the generation of the second HDR image.

7. The method of claim 6, further comprising:
    applying the at least one of the motion estimation technique, motion interpolation technique, or motion prediction technique during the generation of the second HDR image based on motion occurring between the first frame of image data and the second frame of image data.

8. The method of claim 6, further comprising:
    refraining from applying at least one of the motion estimation technique, motion interpolation technique, or motion prediction technique during the generation of the first HDR image.

9. The method of claim 1, the image sensor is operationally coupled to a vehicle.

10. The method of claim 1, wherein the first exposure duration is of a same duration as the third exposure duration and wherein the second exposure duration is of a same duration as the fourth exposure duration.

11. The method of claim 1, wherein the first frame of image data includes a third subset of pixel data associated with a third exposure duration, wherein the third exposure duration is greater than the first exposure duration and less than the second exposure duration, and wherein generating the first HDR image includes generating the first HDR image based on the third subset of pixel data.

12. An apparatus for high dynamic range (HDR) processing, comprising:
    a memory; and
    a processor coupled to the memory and configured to:
    cause an image sensor to receive a first frame of image data and a second frame of image data at a capture frame rate;
    receive the first frame of image data from the image sensor, the first frame of image data including a first subset of pixel data associated with a first exposure duration and a second subset of pixel data associated with a second exposure duration, the second exposure duration being greater than the first exposure duration;
    generate a first HDR image from the first subset of pixel data and the second subset of pixel data;
    receive the second frame of image data from the image sensor, the second frame of image data including a third subset of pixel data associated with a third exposure duration and a fourth subset of pixel data associated with a fourth exposure duration, the fourth exposure duration being greater than the third exposure duration, the third exposure duration beginning subsequent to the first exposure and the fourth exposure duration beginning subsequent to each of the first exposure duration and the second exposure duration;
    generate a second HDR image from the second subset of pixel data and the third subset of pixel data;
    generate a third HDR image from the third subset of pixel data and the fourth subset of pixel data; and output the first HDR image, the second HDR image, and the third HDR image as a video, the video having a higher frame rate than the capture frame.

13. The apparatus of claim 12, wherein the first subset of pixel data is received by a first plurality of lines of the image sensor and where the second subset of pixel data is received from a second subset of lines of the image sensor.

14. The apparatus of claim 13, wherein the first HDR image, the second HDR image, and the third HDR image are staggered HDR images.

15. The apparatus of claim 14, wherein the apparatus further comprises the image sensor including a set of pixel elements, wherein the first subset of pixel data is captured using a first subset of the set of pixel elements, wherein the second subset of pixel data is captured using a second subset of the set of pixel elements.

16. The apparatus of claim 13, wherein the third subset of pixel data is received by the first plurality of lines of the image sensor and wherein the fourth subset of pixel data is received by the second plurality of lines of the image sensor.

17. The apparatus of claim 12, wherein the processor is further configured to:
apply at least one of a motion estimation technique, a motion interpolation technique, or a motion prediction technique during the generation of the second HDR image.

18. The apparatus of claim 17, wherein the processor is further configured to:
apply the at least one of the motion estimation technique, motion interpolation technique, or motion prediction technique during the generation of the second HDR image based on motion occurring between the first frame of image data and the second frame of image data.

19. The apparatus of claim 17, wherein the processor is further configured to:
refrain from applying at least one of the motion estimation technique, motion interpolation technique, or motion prediction technique during the generation of the first HDR image.

20. The apparatus of claim 12, wherein the apparatus is a camera operationally coupled to a vehicle.

21. The apparatus of claim 12, wherein the first exposure duration is of a same duration as to the third exposure duration time and wherein the second exposure duration is of a same duration as the fourth exposure duration.

22. The apparatus of claim 12, wherein the first frame of image data includes a third subset of pixel data associated with a third exposure duration, wherein the third exposure duration is greater than the first exposure duration and less than the second exposure duration, and wherein generating the first HDR image includes generating the first HDR image based on the third subset of pixel data.

23. A non-transitory computer-readable storage medium comprising instructions that, when executed by one or more processors of an apparatus, cause the apparatus to perform operations comprising:
causing an image sensor to receive a first frame of image data and a second frame of image data at a capture frame rate;
receive the first frame of image data from the image sensor, the first frame of image data including a first subset of pixel data associated with a first exposure duration and a second subset of pixel data associated with a second exposure duration, the second exposure duration being greater than the first exposure duration;
generate a first HDR image from the first subset of pixel data and the second subset of pixel data;
receive the second frame of image data from the image sensor, the second frame of image data including a third subset of pixel data associated with a third exposure duration and a fourth subset of pixel data associated with a fourth exposure duration, the fourth exposure duration being greater than the third exposure duration, the third exposure duration beginning subsequent to the first exposure and the fourth exposure duration beginning subsequent to each of the first exposure duration and the second exposure duration;
generating a second HDR image from the second subset of pixel data and the third subset of pixel data;
generating a third HDR image from the third subset of pixel data and the fourth subset of pixel data; and
outputting the first HDR image, the second HDR image, and the third HDR image as a video, the video having a higher frame rate than the capture frame.

24. The non-transitory computer-readable storage medium of claim 23, wherein the first subset of pixel data is received by a first plurality of lines of the image sensor and where the second subset of pixel data is received from a second subset of lines of the image sensor.

25. The non-transitory computer-readable storage medium of claim 23, wherein execution of the instructions causes the apparatus to perform operations further comprising:
applying at least one of a motion estimation technique, a motion interpolation technique, or a motion prediction technique during the generation of the second HDR image.

26. The non-transitory computer-readable storage medium of claim 25, wherein execution of the instructions causes the apparatus to perform operations further comprising:
applying the at least one of the motion estimation technique, motion interpolation technique, or motion prediction technique during the generation of the second HDR image based on motion occurring between the first frame of image data and the second frame of image data.

27. The non-transitory computer-readable storage medium of claim 25, wherein execution of the instructions causes the apparatus to perform operations further comprising:
refraining from applying at least one of the motion estimation technique, motion interpolation technique, or motion prediction technique during the generation of the first HDR image.

28. The non-transitory computer-readable storage medium of claim 23, wherein the image sensor is operationally coupled to a vehicle.

* * * * *